United States Patent [19]
Winkelmann

[11] 3,739,205
[45] June 12, 1973

[54] BRUSH AND SPRING HOLDER ASSEMBLY
[75] Inventor: Herbert E. Winkelmann, Kettering, Ohio
[73] Assignee: General Motors Corporation, Detroit, Mich.
[22] Filed: Aug. 21, 1972
[21] Appl. No.: 282,607

[52] U.S. Cl................... 310/42, 318/242, 318/246
[51] Int. Cl....................... H02k 15/00, H01r 39/40
[58] Field of Search .................... 310/42, 238, 239, 310/242, 245, 246, 247, 248

[56] References Cited
UNITED STATES PATENTS
| | | | |
|---|---|---|---|
| 3,656,018 | 4/1972 | Mahler | 310/242 |
| 3,175,113 | 3/1965 | Simmons et al. | 310/246 |
| 3,154,709 | 10/1964 | Ettema et al. | 310/246 |
| 1,239,056 | 9/1917 | Sparks | 310/247 |

Primary Examiner—D. F. Duggan
Assistant Examiner—H. Huberfeld
Attorney—W. E. Finken and W. A. Schuetz

[57] ABSTRACT

In a preferred form, this disclosure relates to a brush and spring holder assembly for a dynamoelectric machine having a housing, a current collector and a brush for engaging the current collector and which comprises a mounting plate that is adapted to be supported within the housing and which has guide means for supporting and guiding the brush for radial movement toward the current collector. The assembly also comprises a prestressed spring means which is supported on the mounting plate and which has first and second portions for engaging the brush at opposite ends to biasingly retain the brush within the guide means. The first portion is disposed within the path of movement of the current collector as the latter is assembled within the housing and is moved by the current collector to disengage the brush when the current collector is assembled within the housing whereby the second portion biasingly moves the brush into engagement with the current collector.

3 Claims, 7 Drawing Figures

Patented June 12, 1973

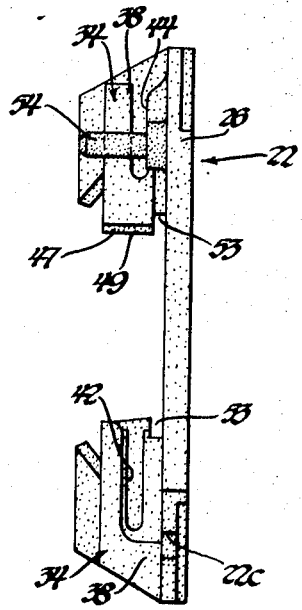
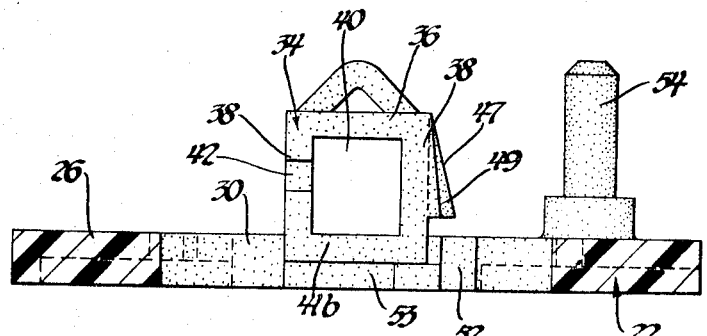
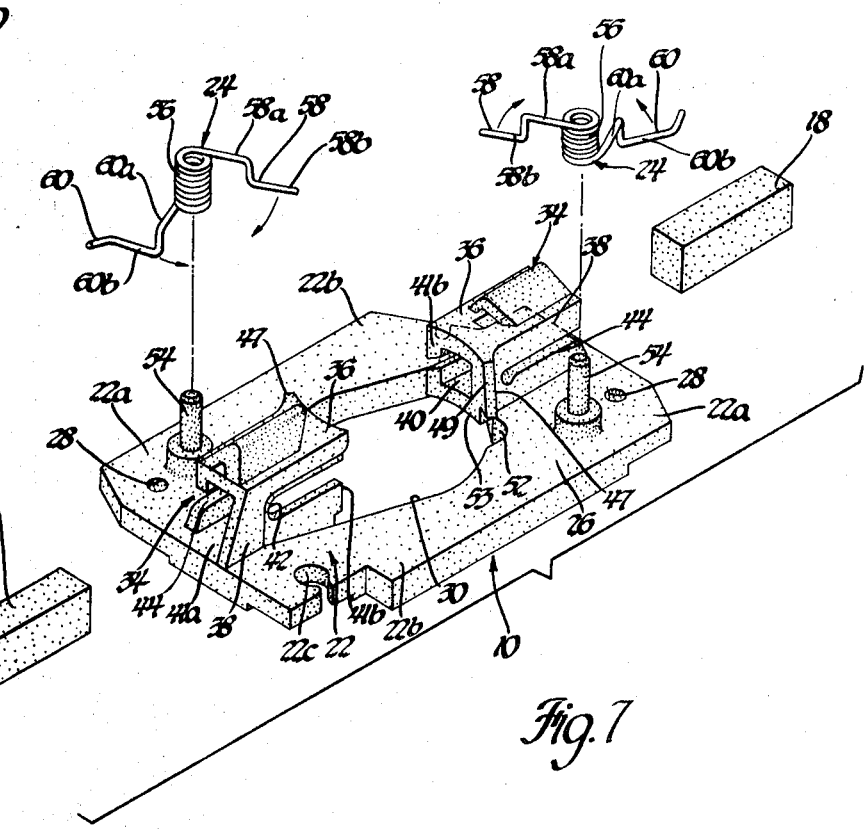

BRUSH AND SPRING HOLDER ASSEMBLY

The present invention relates to a brush and spring holder assembly for a dynamoelectric machine, and more particularly to a brush and spring holder assembly for a dynamoelectric machine which provides for the brushes to be moved into engagement with the current collector of the machine as the current collector is positioned within the machine during assembly.

Brush holder assemblies for dynamoelectric machines have heretofore been provided which have torsion type springs supported thereon and with end portions of the springs biasing brushes within guide slots of a brush holder into engagement with the current collector of the dynamoelectric machine. For example, see U. S. Pat. Nos. 3,154,709 and 1,844,721. Brush holder assemblies, as described above, have also heretofore been provided wherein the springs include second portions which side bias the brushes within the guide slots of the brush holder assembly to prevent chatter and reduce noise. For example, see U. S. Pat. Nos. 3,526,797 and 2,532,827. Brush holder assemblies have also been provided with means for restraining spring biased brushes from engagement with the current collector of the machine and wherein the spring must be moved to enable the brush to engage the current collector when it is assembled within the electrical machine. For example, see U. S. Pat. No. 3,204,138.

The brushes of a dynamoelectric machine are conventionally supported within a brush holder assembly and are biased by a spring means into engagement with the current collector of the machine. However, during assembly of the machine, it is necessary to position the brushes out of the path of movement of the current collector as it is received within the machine. Normally, this entails moving and retaining the brushes against the spring means until the current collector is received within the machine. Because little space is available within the machine for manually restraining the brushes against the bias of the spring means during assembly of the current collector, it is highly desirable that the brushes be restrained by another means which can be easily released when the current collector is properly positioned within the dynamoelectric machine so that the brushes can be biased into engagement with the current collector.

Accordingly, an object of the present invention is to provide a new and improved brush and spring holder assembly wherein spring means retain the brushes out of the path of movement of the current collector until it is assembled within the dynamoelectric machine and wherein the spring means release the brushes and biasingly move the same into engagement with the current collector in response to the latter being received within the machine during assembly.

Another object of the present invention is to provide a new and improved brush and spring holder assembly for a dynamoelectric machine having a housing, a current collector and a brush for engaging the current collector and which comprises a mounting plate that is adapted to be supported within the housing and which has guide means for supporting and guiding the brush for radial movement into engagement with the current collector, and which also comprises a pre-stressed spring means that is supported upon the mounting plates and which has a first and second end portion for engaging the opposite ends of the brush to biasingly retain the brush within the guide means until the current collector is assembled within the housing, the first end portion is disposed within the path of movement of the current collector when the latter is assembled within the housing and is engaged and moved by the current collector to disengage the brush as the current collector is received within the machine so that the second end portion of the spring means can thereafter move the brush into engagement with the current collector.

These and other objects of the present invention are accomplished, in the preferred embodiment of the present invention, by providing a brush holder and spring assembly for a dynamoelectric machine which has a housing, a commutator, and a plurality of brushes to be engaged with a commutator and which comprises a mounting plate which is adapted to be supported within the machine and which has a central opening to receive the commutator during assembly of the electrical machine. The mounting plate has a plurality of enclosed guide channels radially spaced about the central opening and which support and guide individual ones of the brushes for radial movement toward and from the commutator. The assembly also comprises a plurality of pre-stressed torsion springs which are supported upon the mounting plate adjacent different ones of the guide channels and which have first and second end portions engaged with the opposite ends of the brushes to biasingly retain the brushes within the guide channels until the commutator is assembled within the housing. The first end portions of the springs are disposed adjacent the central opening and are engaged and moved by the end of the commutator to disengage the brushes as the commutator approaches the central opening of the mounting plate and, thereafter, the first portions move resiliently from the path of the commutator for the commutator to be received through the central opening of the mounting plate whereby the second end portions biasingly move the brushes into engagement with the commutator when the first end portion is disengaged from the brushes.

These and other objects of the invention will become more fully apparent from the following description and drawings wherein:

FIG. 5 is a side elevational view of the part shown in FIG. 4;

FIG. 6 is a sectional view taken along line 6—6 in FIG. 4; and

FIG. 7 is an exploded perspective view of the brush and spring holder assembly of the present invention.

Figure 1:
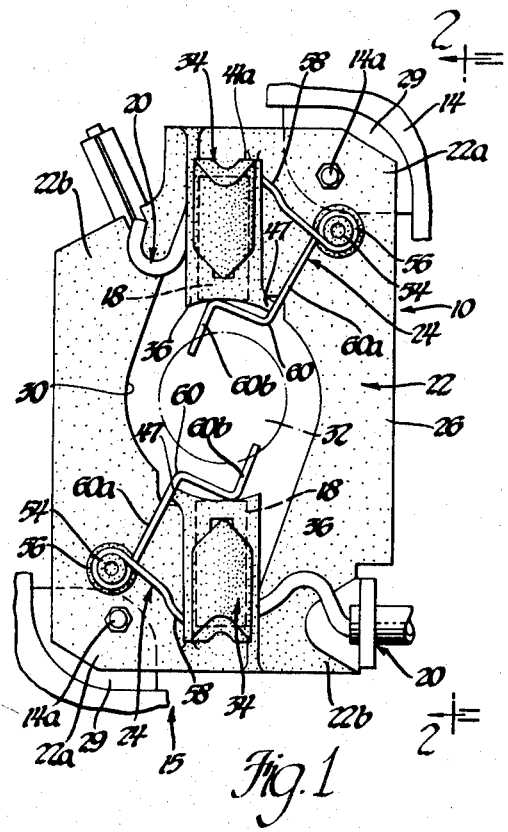
FIG. 1 is a fragmentary front elevational view of a dynamoelectric machine embodying the brush and spring holder assembly for the present invention.

As representing a preferred embodiment of the present invention, the drawings show a brush and spring holder assembly 10 which is adapted to be mounted to a housing 14 of a dynamoelectric machine or electric motor 15 by any suitable mechanical means, herein shown as bolts 14a. The dynamoelectric machine 15, which can be of any conventional and suitable variety, includes a rotatable armature which carries a current collector or commutator 16 which rotates in electrical contact with a pair of brushes 18. The brushes 18 are suitably connected via wire and clip assemblies 20 with either a source of electrical power (not shown) or with a device for either storing electrical power or operated upon electrical power (not shown) depending upon whether the purpose of the dynamoelectric machine is to serve as a motor or a generator.

The brush and spring holder assembly 10 of the present invention broadly comprises a mounting plate 22 which supports the brushes 18 and a pre-stressed spring means 24 which both biasingly retains the brushes 18 until the commutator 16 is assembled within the housing 14 of the dynamoelectric machine 15 during assembly and which, upon assembly of the commutator 16 within the machine 15 biases the brushes 18 for movement into engagement with the commutator 16.

Figure 2:
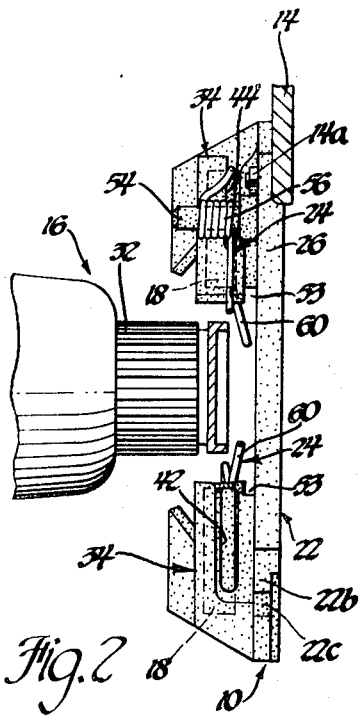
FIG. 2 is a fragmentary plan view with portions shown in section of the dynamoelectric machine embodying the brush and spring holder assembly of the present invention.

Referring to FIGS. 4 - 7, the mounting plate 22 is shown as a one-piece member of any suitable electrically nonconductive material, such as a ceramic material. The mounting plate 22 has a flat, generally rectangularly shaped base portion 26 with two holes 28 in two diametrically opposed corner portions 22a which are adapted to receive the bolts 14a for attaching and mounting the assembly 10 to a pair of brackets 29 within the housing 14 of the dynamoelectric machine, as shown in FIGS. 1 and 2. The other two opposite corner portions 22b of the mounting plate 22 have slots 22c for receiving the wire and clip assemblies 20 leading from the brushes 18.

The mounting plate 22 also includes a relatively large, circular, centrally located aperture 30 which extends therethrough to allow one end portion 32 of the commutator 16 to pass through the mounting plate 22 during assembly of the dynamoelectric machine 15. This also allows the mounting plate 22 to assume a substantially concentric relationship about the commutator 16. The mounting plate 22 has a pair of guide supports 34 which are integral with the base 26 and which are located at opposite positions that are immediately adjacent the central aperture 30. In this respect, one of the guide supports 34 is located adjacent the upper portion of the central aperture 30 and the other of the guide supports 34 is located adjacent the lower end of the central aperture 30. Each guide support 34 has an upper wall 36, as viewed in FIGS. 6 and 7, a pair of side walls 38 and a bottom wall defined by the base portion 26. The walls 36, 38 and 26 define a guide passage or channel 40 therebetween. The guide channel 40 so defined is generally rectangular and complementary in shape to the brushes 18. It should also be noted that the guide supports 34 are open ended to enable the brushes 18 to be received within the guide channel 40 at the outer ends 41a and to engage the commutator 16 via the inner ends 41b adjacent the central aperture 30.

Each guide support 34 has a longitudinally extending slot 42 in one of its side walls 38 to enable each of the lead wires of the wire and clip assemblies 20, which are connected with the brushes 18, to pass through the side walls 38 and move with brushes 18, as will later be described in more detail. The other of the side walls 38 of each guide support 34 also has a longitudinally extending slot 44 which extends from the end 41a toward the end 41b, but which terminates adjacent a ramp projection 47 integral with the end 41b. The ramp projection 47 extends outwardly from the side wall 38 of the guide supports 34 having the slot 44 and at a location adjacent the central aperture 30. The ramp projection 47 terminates in a flat ramp surface 49 which extends from the upper wall 36 but which terminates before reaching the base 26 of the mounting plate 22. Immediately adjacent the ramp projection 47, the central aperture 30 has a cut out or radially relieved portion 52. Further, it should also be noted that the base 26 defining the bottom wall of the guide support 34 immediately adjacent the central aperture 30 has a notched or relieved portion 53, as best shown in FIGS. 5 - 7. The mounting plate 22 also includes a pair of integral support studs or pins 54 located adjacent the side walls 38 having the second slots 44 therein.

Figure 3:
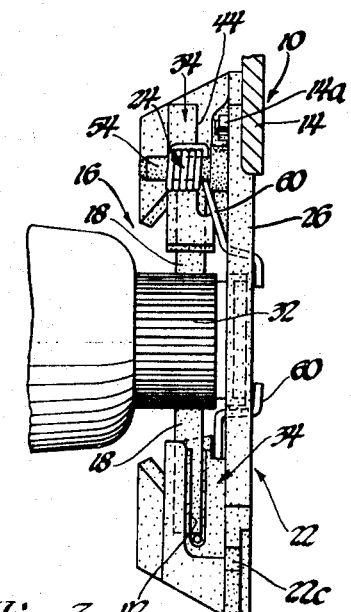
FIG. 3 is a view similar to FIG. 2 but showing different parts in different positions.
Figure 4:
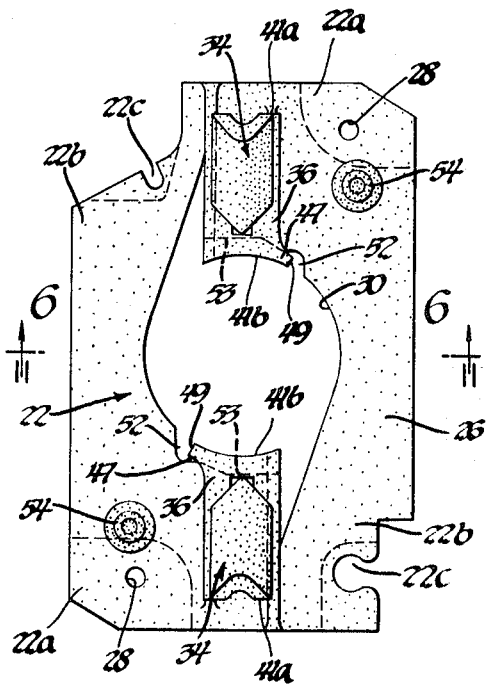
FIG. 4 is a front elevational view of part of the brush and spring holder assembly of the present invention.

The spring means 24, as shown in FIGS. 1 and 7, comprise a pair of torsion springs having central coiled portions 56 which are received and supported upon the studs 54 adjacent the two guide supports 34 and which have a first bent end portion 58 and a second bent end portion 60. The torsion springs 24 are shown in their free state in FIG. 7, and are shown in FIGS. 1 - 3 in their pre-stressed state. Once the brushes 18 are slidably received within the guide channels 40 of the guide supports 34 in a completely withdrawn position from the central aperture 30, the two bent end portions 58 and 60 of the torsion springs 24 are each rotated approximately 90° in the opposite directions as shown by the arrows in FIG. 7, to their pre-stressed state. While in their pre-stressed state, the central coil portions 56 of the torsion springs 24 are received upon the support studs 54 and, simultaneously, straight legs or sections 58a of bent end portion 58 are received within the longitudinally extending slots 44 of the guide supports 34 and an L-shaped leg or section 58b are positioned in engagement with one end of the brushes 18. Further, straight legs or sections 60a are positioned in engagement with the ramp surfaces 49 of the ramp projections 47 of the guide supports 34 and L-shaped legs or sections 60b of the bent end portions 60 are positioned in engagement with the other end of the brushes 18 immediately adjacent the central aperture 30. Thus, in their pre-stressed state, the first bent end portions 58 of the torsion springs 24 engage one end of the brushes 18 and bias the brushes 18 radially inward with respect to the central aperture 30 and the second bent end portions 60 engage the opposite end of the brushes 18 and counterbalance the bias of the first end portions 58. Thus, it should be understood that the torsion springs, by virtue of the counterbalancing forces they place upon the brushes 18, serve to retain the brushes 18 within the guide supports 34 and in a withdrawn position with respect to the central aperture 30, as is best shown in FIG. 2. With reference to FIG. 2, it should also be noted that, during assembly, the commutator 16 will be unencumbered by the brushes 18 when they are retained in their withdrawn position within the guide supports 34 and thus can enter the central aperture 30 of the mounting plate 22 without interference. Further, with reference to FIGS. 1 and 2, it should be noted that the L-shaped leg 60b of the bent end portion 60 of the torsion springs 24 extends out over the central aperture 30 and into the path the end 32 of the commutator 16 follows through the central aperture 30 during assembly. It is in the above-described state that the brush and spring holder assembly 10 is mounted within the housing 14 of the dynamoelectric machine 15 during the assembly of the machine. The assembly 10 is shown mounted within the machine 15 with the brushes 18 in a vertical relationship, but could also be mounted to the machine 15 with the brushes 18 in a horizontal relationship. Significantly, if the brushes 18 are in a vertical relationship, the frictional engagement between the brushes 18 and the guide supports 34 and springs 24 is sufficient to prevent the upper brush 18 from sliding downwardly against the bias of the spring 24 and into the central aperture 30.

With reference to FIGS. 1 – 3, it should be seen that, during assembly of the commutator 16 within the housing 14, the end 32 of the commutator 16 passes between the guide supports 34 and the end portion 32 of the commutator 16 engages the L-shaped leg 60b of the bent end portions 60. Should the brushes 18 accidently be extending into the aperture 30 such that they would encumber assembly of the commutator 16, they can be manually pushed back into the guide supports 34 where they will be retained by the springs 24. As the end portion 32 of the commutator 16 enters the central aperture 30, the end portion 32 of the commutator moves the L-shaped leg 60b and causes the bent end portions 60 to slide out of engagement with the ends of the brushes 18 adjacent aperture 30 to thus enable the first bent end portion 58 of the torsion springs 24 to bias the brushes 18 radially inwardly into engagement with the commutator 16. Further, as the end 32 of the commutator 16 passes through the central aperture 30, the straight legs 60a of the bent end portions 60 are caused to slide off the ramp surfaces 49 of the ramp projections 47 and, by virtue of the pre-stressed condition of the torsion springs 24, the bent end portions 60 spring resiliently into the relieved portions 52 and 53 adjacent the guide supports 34. Thus, they are cleared from the path of the end 32 of the commutator 16 to enable the commutator 16 to pass unencumbered completely through the aperture 30. It should also be noted that as the brushes 18 wear during the life of the dynamoelectric machine, as a result of their engagement with the end 32 of the commutator 16, the torsion springs 24 will continue to bias and retain the brushes 18 in engagement with the commutator 16.

The foregoing disclosure relates to only one embodiment of the invention which may be modified within the scope of the appended claims.

What is claimed is:

1. A brush and spring holder assembly for a dynamoelectric machine having a housing, a current collector and a brush for engaging the current collector, comprising: a mounting plate adapted to be supported within the housing and which has a guide means for supporting and guiding the brush for radial movement toward the current collector; and a pre-stressed spring means supported on said mounting plate and having first and second portions in engagement with the opposite ends of the brush, said spring means being operable to biasingly retain the brush within the guide means when its first and second portions are in engagement with the opposite ends of the brush, said first portion being disposed in the path of movement of the current collector when the latter is being assembled to the housing, said current collector being engageable with and moving said first portion of the spring means to disengage the same from the brush as the current collector is received within the housing whereby said second portion biasingly moves the brush into engagement with the current collector.

2. In a dynamoelectric machine, the combination comprising: a housing; a commutator; brushes to be engaged with said commutator; and a brush holder and spring assembly, having a mounting plate adapted to be supported within the electrical machine and having a central aperture to provide for the commutator to be received therethrough during assembly of the electrical machine, said mounting plate having a plurality of enclosed guide means radially spaced about said central opening and supporting and guiding said brushes for inward radial movement into engagement with the commutator; and a plurality of prestressed torsion springs supported upon said mounting plate adjacent said guide means and having first and second end portions engaging and biasing opposite ends of said brushes to retain the brushes within said guide means, said first end portions being disposed adjacent said central aperture and within the path of said commutator during its assembly to said housing to be moved by the end of the commutator to disengage the brushes as the commutator approaches said central aperture of said mounting plate, said second end portions biasingly moving the brushes into engagement with the commutator when the first end portions are disengaged with the brushes, and said first end portion thereafter moving resiliently from the path of the commutator for the commutator to be received through said central opening of said mounting plate.

3. In a dynamoelectric machine, the combination comprising: a stator housing; a rotatable armature having a commutator; brushes to be engaged with said commutator; and a brush holder and spring assembly having a mounting plate adapted to be supported within the housing and having a central aperture for the commutator to be received therethrough during assembly of the commutator to the housing, said mounting plate having integral enclosed guide support members radially spaced about said central aperture for guiding individual brushes for radial movement toward and from the commutator, said guide support members extending into said central aperture and having longitudinally extending slots therein, said guide means also having a ramp portion adjacent said central aperture, said mounting plate also having support studs adjacent each of said guide support members; and pre-stressed torsion springs having intermediate coiled portions concentrically supported upon said mounting pins, said pre-stressed torsion springs having first end portions disposed within said slots of said guide support members and engaging one end of the brushes and biasing the brushes toward said central aperture, said pre-stressed torsion springs having second end portions engaged with the other end of the brushes and said ramp of said guide support members and acting against the bias of said first end portions to retain the brushes within said guide support members, said second end portions also being disposed adjacent said central aperture and being adapted to be engaged by the end of the commutator as the commutator approaches said central aperture during assembly of the commutator to the housing, said second end portions being moved by the commutator and disengaging the other ends of the brushes for said first end portions to biasingly move the brushes radially inwardly into engagement with the commutator, thereafter said second end portions being moved to disengage said ramp of said guide support members and moving resiliently from the path of said commutator to enable the commutator to pass unencumbered through said central aperture.

* * * * *